United States Patent
Lin

(10) Patent No.: US 10,028,398 B1
(45) Date of Patent: Jul. 17, 2018

(54) PIVOTAL DEVICE FOR A SUPPORT OF AN ELECTRONIC DEVICE

(71) Applicant: Leohab Enterprise Co., Ltd., Taichung (TW)

(72) Inventor: Chao-Chi Lin, Taichung (TW)

(73) Assignee: Leohab Enterprise Co., Ltd., Taichung (TW)

( * ) Notice: Subject to any disclaimer, the term of this patent is extended or adjusted under 35 U.S.C. 154(b) by 0 days.

(21) Appl. No.: 15/406,815

(22) Filed: Jan. 16, 2017

(51) Int. Cl.
| | |
|---|---|
| *A47B 97/04* | (2006.01) |
| *H05K 5/02* | (2006.01) |
| *E05D 3/18* | (2006.01) |
| *E05F 1/12* | (2006.01) |
| *E05D 11/06* | (2006.01) |
| *E05D 11/00* | (2006.01) |

(52) U.S. Cl.
CPC ............ *H05K 5/0226* (2013.01); *E05D 3/18* (2013.01); *E05D 11/0054* (2013.01); *E05D 11/06* (2013.01); *E05F 1/1207* (2013.01); *H05K 5/0234* (2013.01); *E05Y 2900/606* (2013.01)

(58) Field of Classification Search
CPC ...... H05K 5/0226; H05K 5/0234; E05D 3/18; E05D 11/0054; E05D 11/06; E05D 11/1207; E05D 3/06; E05D 7/06; E05D 15/30; E05D 1/04; E05Y 2900/606; A47B 23/04; G06F 1/1681

USPC .......................................................... 248/447
See application file for complete search history.

(56) References Cited

U.S. PATENT DOCUMENTS

| | | | |
|---|---|---|---|
| 9,366,064 B1* | 6/2016 | Chen | .......................... E05D 3/12 |
| 9,404,298 B1* | 8/2016 | Chen | ...................... G06F 1/1681 |
| 9,518,414 B1* | 12/2016 | Chen | ...................... G06F 1/1681 |
| 9,784,406 B1* | 10/2017 | Lin | .......................... F16M 13/00 |
| 9,797,546 B1* | 10/2017 | Lin | .......................... F16M 11/04 |
| 2016/0097227 A1* | 4/2016 | Hsu | ............................ G06F 1/16 |
| | | | 16/354 |
| 2017/0003719 A1* | 1/2017 | Siddiqui | .................... E05D 1/04 |
| 2017/0208703 A1* | 7/2017 | Lin | ........................ E05F 1/1016 |
| 2017/0344067 A1* | 11/2017 | Lan | ............................ E05D 3/18 |

* cited by examiner

*Primary Examiner* — Christopher Garft
(74) *Attorney, Agent, or Firm* — Alan D. Kamrath; Kamrath IP Lawfirm, P.A.

(57) ABSTRACT

A pivotal device for a support of an electronic device includes a base and a flip module. The flip module includes first, second movable member, and third movable members. The second movable member is pivotably connected to the first movable member and is slideably mounted to the base. The third movable member is pivotably connected to the base and the second movable member and is slideably mounted to the first movable member. When the third movable member pivots relative to the second movable member, frictional resistance is generated to fix an angle between the third movable member and the second movable member. Operation of the pivotal device during the extending or closing procedure is smooth.

9 Claims, 7 Drawing Sheets

PIVOTAL DEVICE FOR A SUPPORT OF AN ELECTRONIC DEVICE

BACKGROUND OF THE INVENTION

The present invention relates to a pivotal device and, more particularly, to a pivotal device for a support of an electronic device.

With the flourishing development of the electronic industry, more and more users use electronic devices, such as tablet computers, for amusement or business. During use of an electronic product, a user generally holds left and right sides of the electronic product and is, thus, apt to have a fatigue feeling in the hands. More and more tablet computers are increased in the size of the screen and the weight to meet the need of watching films, which further increases the fatigue of the hands or even causes pain. Although the user can place the electronic device on the laps or a desk, it is not always comfortable for the user to watch the films, and the operation is inconvenient to the user.

Thus, a need exists for a novel pivotal device of a support for an electronic device that overcomes the above disadvantages.

BRIEF SUMMARY OF THE INVENTION

A pivotal device for a support of an electronic device according to the present invention includes a base and a flip module. The base includes a pivotal portion and a sliding portion. The flip module includes a first movable member, a second movable member, and a third movable member. The first movable member includes a pivotal portion and a sliding portion. The second movable member includes a first pivotal portion, a sliding portion, and a second pivotal portion between the first pivotal portion and the sliding portion of the second movable member. The first pivotal portion of the second movable member is pivotably connected to the pivotal portion of the first movable member. The sliding portion of the second movable member is mounted to the sliding portion of the base and is slideable relative to the base. The third movable member includes a first pivotal portion, a sliding portion, and a second pivotal portion between the first pivotal portion and the sliding portion of the third movable member. The first pivotal portion of the third movable member is pivotably connected to the pivotal portion of the base. The sliding portion of the third movable member is mounted to the sliding portion of the first movable member and is slideable relative to the first movable member. The second pivotal portion of the third movable member is pivotably connected to the second pivotal portion of the second movable member. When the third movable member pivots relative to the second movable member, frictional resistance is generated to fix an angle between the third movable member and the second movable member.

In an example, the frictional resistance is generated by tight coupling between the second movable member and the third movable member.

In an example, the base includes two sidewalls and a space between the two sidewalls. The flip module is received in the space of the base and is movable relative to the base. The sliding portion of the second movable member is received in the space of the base and includes two opposite sides respectively abutting the two sidewalls of the base. The first pivotal portion of the third movable member is received in the space of the base and includes two opposite sides respectively abutting the two sidewalls of the base.

In an example, the base further includes a stopper plate, a cover, and an elastic member. The stopper plate, the cover, and the elastic member are located in the space. The stopper plate includes two opposite ends securely fixed to the two sidewalls, respectively. The cover is coupled to the stopper plate. When the flip module is in a completely closed position, the first movable member and the cover are contiguous to each other. The elastic member includes first and second ends and a coil portion between the first and second ends. The first end of the elastic member abuts the stopper plate. The coil portion of the elastic member includes a plurality of turns and located between the stopper plate and the cover. The second end of the elastic member abuts the first movable member.

In an example, the elastic member is a torsion spring.

In an example, the two sidewalls of the base respectively include two sides adjacent to each other. Each of the two sides has a stopper portion. The elastic member is stopped by the stopper portions when the flip module is in an extended state.

In an example, the first pivotal portion of the second movable member disposed on an end of the second movable member adjacent to the base. The sliding portion of the second movable member is disposed on another end of the second movable member opposite to the first pivotal portion of the second movable member. The first pivotal portion of the third movable member is disposed on an end of the third movable member adjacent to the first movable member. The sliding portion of the third portion is disposed on another end of the third movable member opposite to the first pivotal portion of the third movable member.

In an example, the second movable member includes a bridge having a first end connected to the first pivotal portion of the second movable member and a second end connected to the sliding portion of the second movable member. The second pivotal portion of the second movable member is disposed on the bridge of the second movable member. The third movable member includes two bridges. Each of the two bridges includes a first end connected to the first pivotal portion of the third movable member and a second end connected to the sliding portion of the third movable member. The second pivotal portion of the third movable member is disposed on the two bridges of the third movable member. The bridge of the second movable member is disposed between the two bridges of the third movable member by tight coupling.

In an example, the pivotal portion of the base is a through-hole extending through the two sidewalls of the base. The sliding portion of the base is an elongated groove extending through the two sidewalls of the base. The pivotal portion of the first movable member includes a through-hole extending through the first movable member. The sliding portion of the first movable member is an elongated groove extending through the first movable member. The flip module includes an axle unit having a first axle, a second axle, a third axle, a fourth axle, and a fifth axle. The first axle extends through the sliding portion of the second movable member and slideably extends through the sliding portion of the base. The second axle extends through the pivotal portion of the base and the first pivotal portion of the third movable member. The third axle extends through the pivotal portion of the first movable member and the first pivotal portion of the second movable member. The fourth axle extends through the sliding portion of the third movable member and slideably extends through the sliding portion of the first movable member. The fifth axle extends through the second pivotal portion of the second movable member and the second pivotal portion of the third movable member.

The present invention will become clearer in light of the following detailed description of illustrative embodiments of this invention described in connection with the drawings.

DETAILED DESCRIPTION OF THE INVENTION

Figure 1:
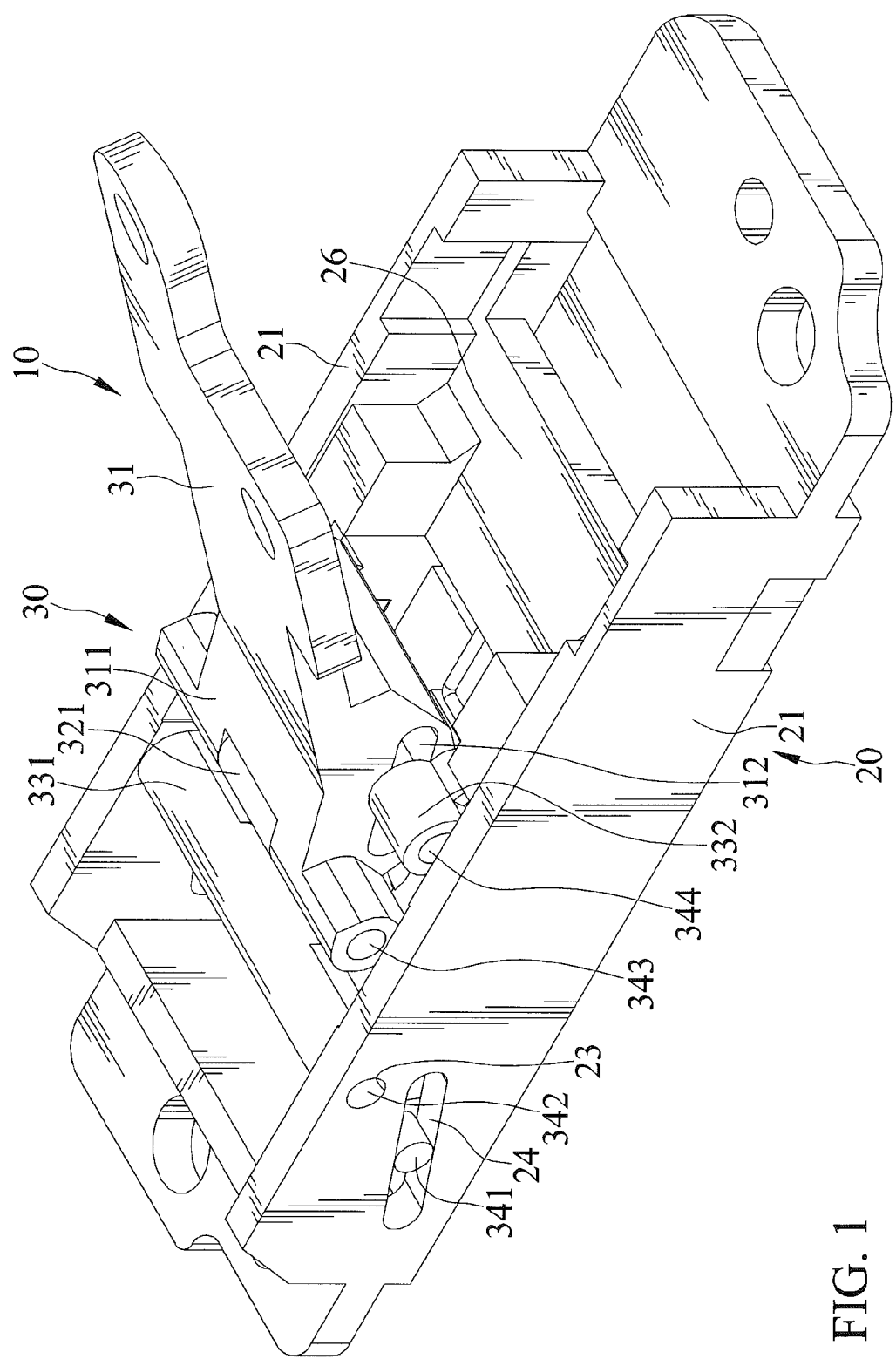
FIG. 1 is a perspective view of a pivotal device for a support of an electronic device according to the present invention.
Figure 2:
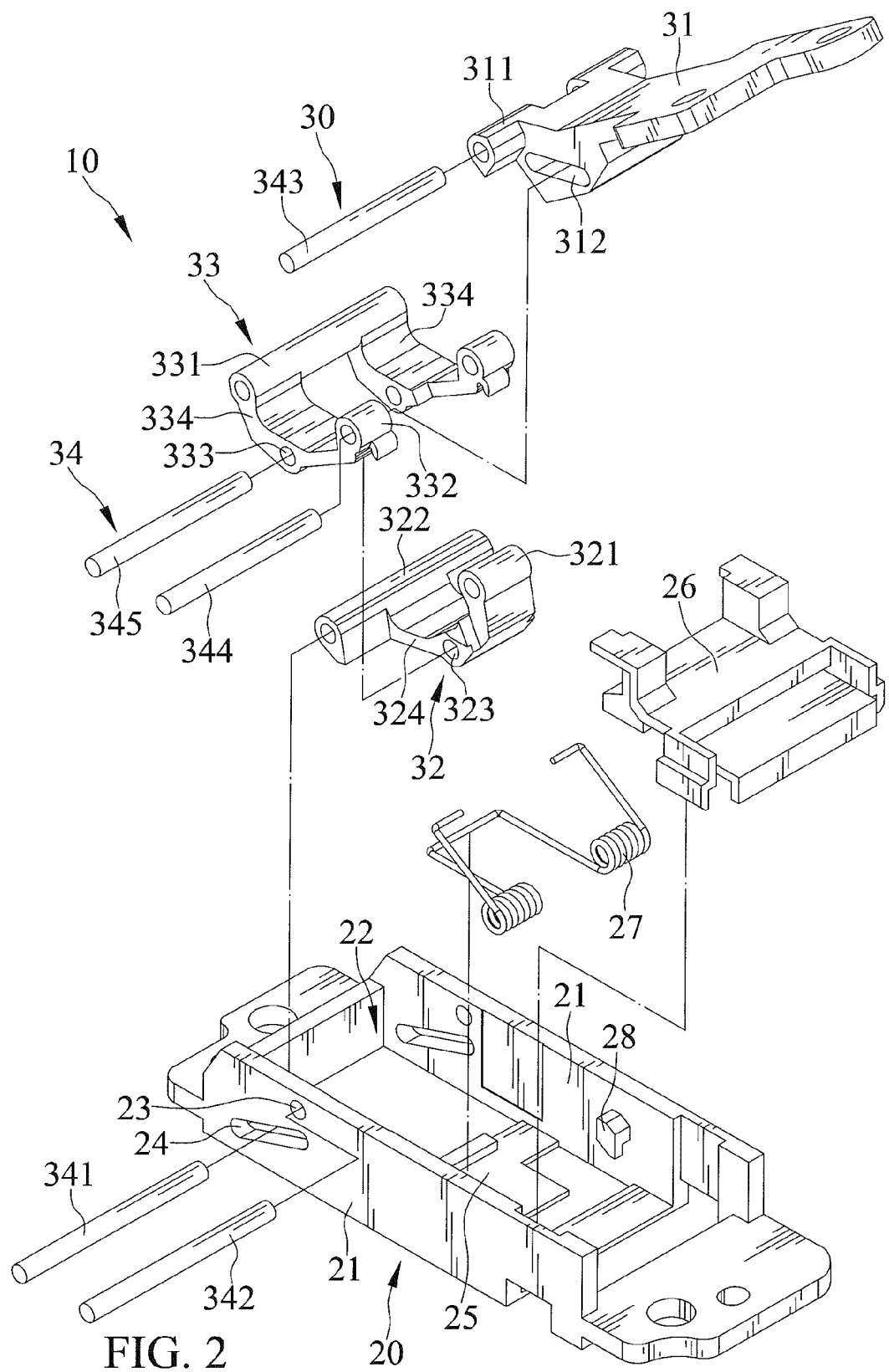
FIG. 2 is an exploded, perspective view of the pivotal device of FIG. 1.
Figure 3:
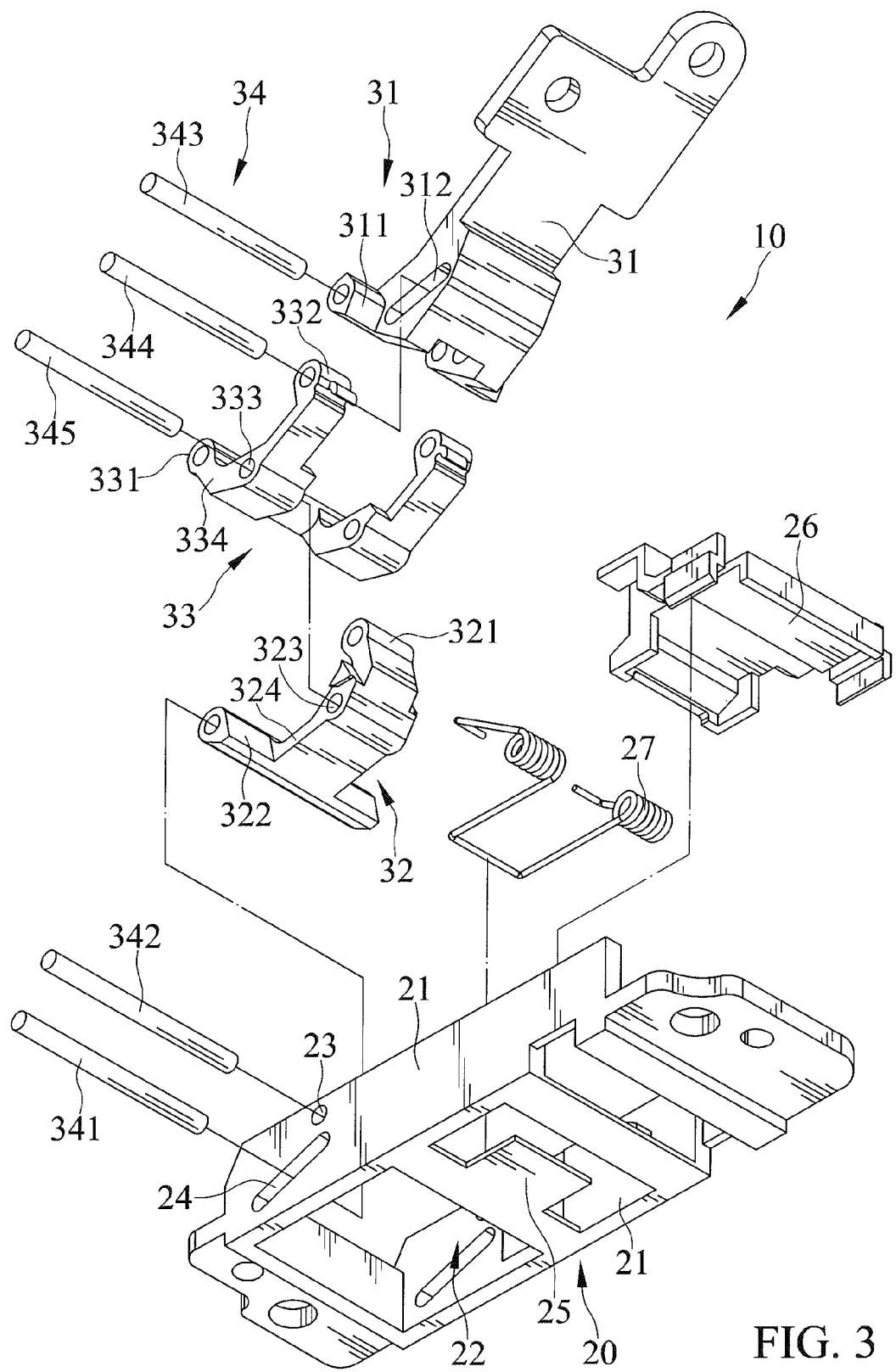
FIG. 3 is another exploded, perspective view of the pivotal device of FIG. 1.
Figure 4:
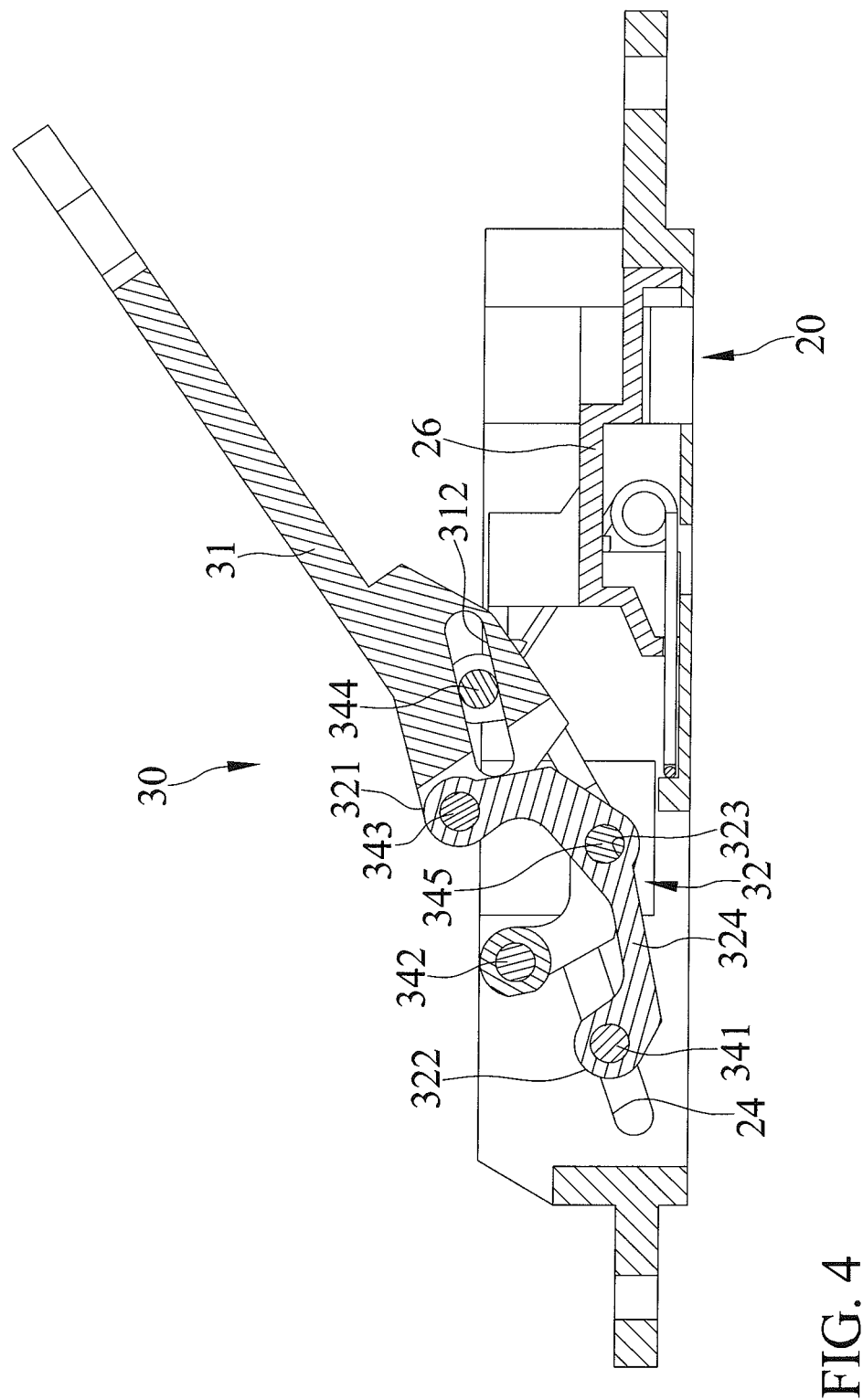
FIG. 4 is a cross sectional view of the pivotal device of FIG. 1.
Figure 5:
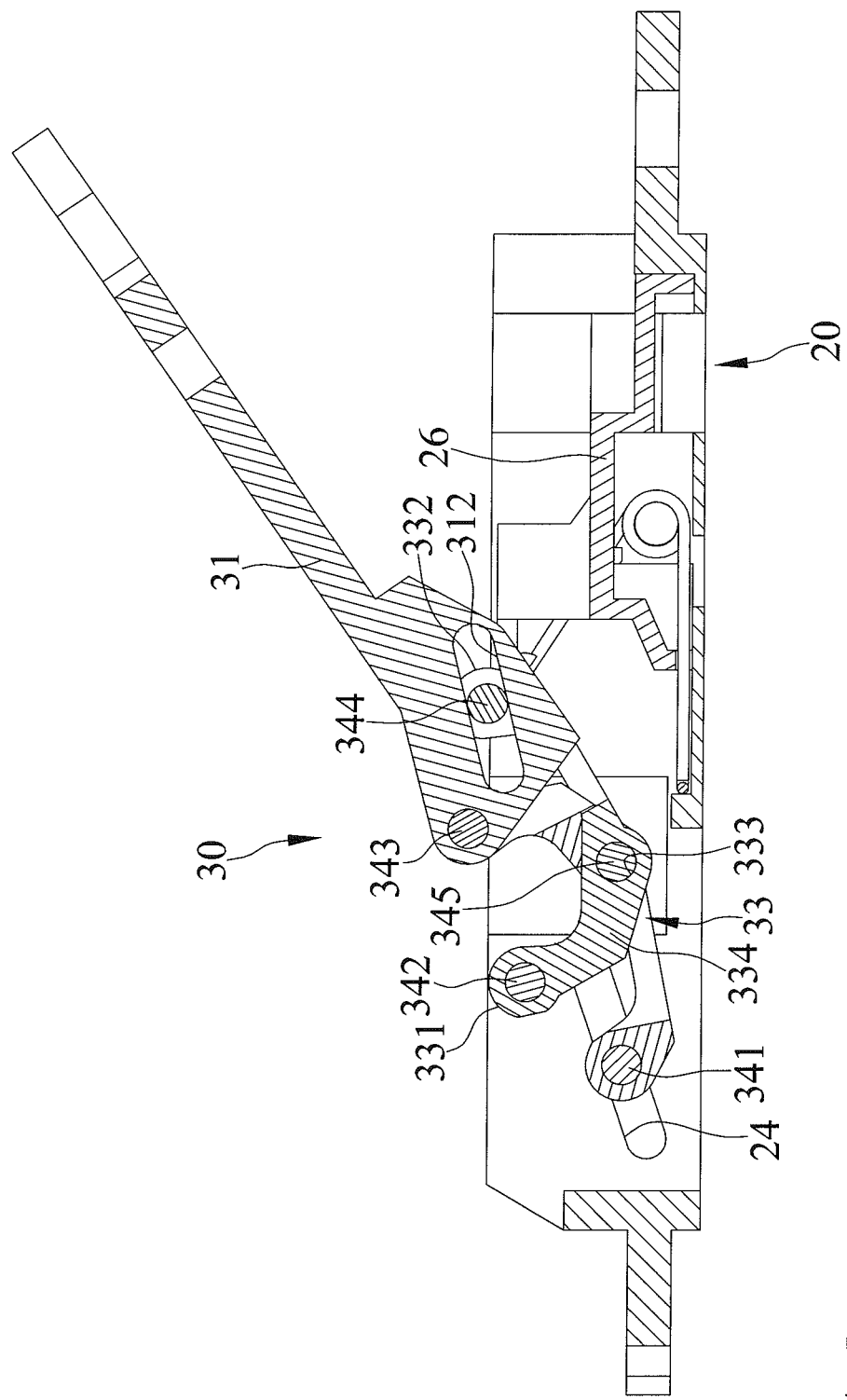
FIG. 5 is a cross sectional view of the pivotal device of FIG. 1 in another position.

With reference to FIGS. 1-5, a pivotal device 10 for a support of an electronic device according to the present invention includes a base 20 and a flip module 30. The base 20 includes two sidewalls 21 and a space 22 between the two sidewalls 21. The base 20 further includes a pivotal portion 23 and a sliding portion 24. In this embodiment, the pivotal portion 23 of the base 20 is in the form of a through-hole extending through the two sidewalls 21 of the base 20, and the sliding portion 24 of the base 20 is in the form of an elongated groove extending through the two sidewalls 21 of the base 20.

The base 20 further includes a stopper plate 25, a cover 26, and an elastic member 27. The stopper plate 25, the cover 26, and the elastic member 27 are located in the space 22. The stopper plate 25 includes two opposite ends securely fixed to the two sidewalls 21, respectively. The cover 26 is coupled to the stopper plate 25. The elastic member 27 includes first and second ends and a coil portion between the first and second ends. The first end of the elastic member 27 abuts the stopper plate 25. The coil portion of the elastic member 27 includes a plurality of turns and is located between the stopper plate 25 and the cover 26. The two sidewalls 21 of the base 20 respectively include two sides adjacent to each other. Each of the two sides has a stopper portion 28.

The flip module 30 is received in the space 22 of the base 20 and is movable relative to the base 20. The flip module 30 includes a first movable member 31, a second movable member 32, and a third movable member 33. The first movable member 31 includes a pivotal portion 311 and a sliding portion 312. The pivotal portion 311 of the first movable member 31 includes a through-hole extending through the first movable member 31. The sliding portion 312 of the first movable member 31 is in the form of an elongated groove extending through the first movable member 31. The second end of the elastic member 27 abuts the first movable member 31. In this embodiment, the elastic member 27 is a torsion spring.

The second movable member 32 includes a first pivotal portion 321 on an end thereof adjacent to the first movable member 31. The second movable member 32 further includes a sliding portion 322 on another end thereof opposite to the first pivotal portion 321. The second movable member 32 further includes a second pivotal portion 323 between the first pivotal portion 321 and the sliding portion 322 of the second movable member 32. The first pivotal portion 321 of the second movable member 32 is pivotably connected to the pivotal portion 311 of the first movable member 31. The sliding portion 322 of the second movable member 32 is mounted to the sliding portion 24 of the base 20 and is slideable relative to the base 20. The sliding portion 322 of the second movable member 32 is received in the space 22 of the base 20 and includes two opposite sides respectively abutting the two sidewalls 21 of the base 20. The second movable member 32 further includes a bridge 324 having a first end connected to the first pivotal portion 321 of the second movable member 32 and a second end connected to the sliding portion 322 of the second movable member 32. The second pivotal portion 323 of the second movable member 32 is disposed on the bridge 324 of the second movable member 32.

The third movable member 33 further includes a first pivotal portion 331 on an end thereof adjacent to the base 20. The third movable member 33 further includes a sliding portion 332 on another end thereof opposite to the first pivotal portion 331. The third movable member 33 further includes a second pivotal portion 333 between the first pivotal portion 331 and the sliding portion 332 of the third movable member 33. The first pivotal portion 331 of the third movable member 33 is pivotably connected to the pivotal portion 23 of the base 20. The first pivotal portion 331 of the third movable member 33 is received in the space 22 of the base 20 and includes two opposite sides respectively abutting the two sidewalls 21 of the base 20. The sliding portion 332 of the third movable member 33 is mounted to the sliding portion 312 of the first movable member 31 and is slideable relative to the first movable member 33. The second pivotal portion 333 of the third movable member 33 is pivotably connected to the second pivotal portion 323 of the second movable member 32.

The third movable member 33 includes two bridges 334. Each of the two bridges 334 includes a first end connected to the first pivotal portion 331 of the third movable member 33 and a second end connected to the sliding portion 332 of the third movable member 33. The second pivotal portion 333 of the third movable member 33 is disposed on the two bridges 334 of the third movable member 33. The bridge 324 of the second movable member 32 is disposed between the two bridges 334 of the third movable member 33 by tight coupling. Thus, when the third movable member 33 pivots relative to the second movable member 32, frictional resistance is generated to fix an angle between the third movable member 33 and the second movable member 32.

The flip module 30 includes an axle unit 34 having a first axle 341, a second axle 342, a third axle 343, a fourth axle 344, and a fifth axle 345. The first axle 341 extends through the sliding portion 322 of the second movable member 32 and slideably extends through the sliding portion 24 of the base 20. The second axle 342 extends through the pivotal portion 23 of the base 20 and the first pivotal portion 331 of the third movable member 33. The third axle 343 extends through the pivotal portion 311 of the first movable member 31 and the first pivotal portion 321 of the second movable member 32. The fourth axle 344 extends through the sliding portion 332 of the third movable member 33 and slideably extends through the sliding portion 312 of the first movable member 31. The fifth axle 345 extends through the second pivotal portion 323 of the second movable member 32 and the second pivotal portion 333 of the third movable member 33.

Figure 6:
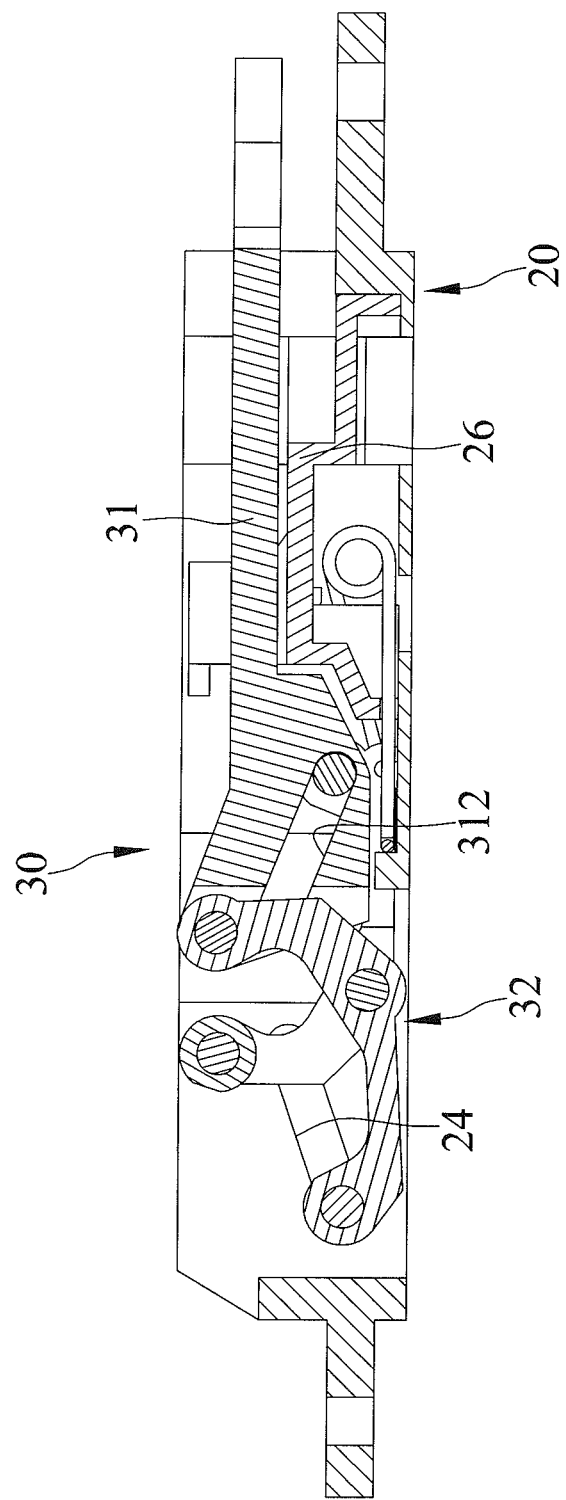
FIG. 6 is a cross sectional view of the pivotal device in a closed position.
Figure 7:
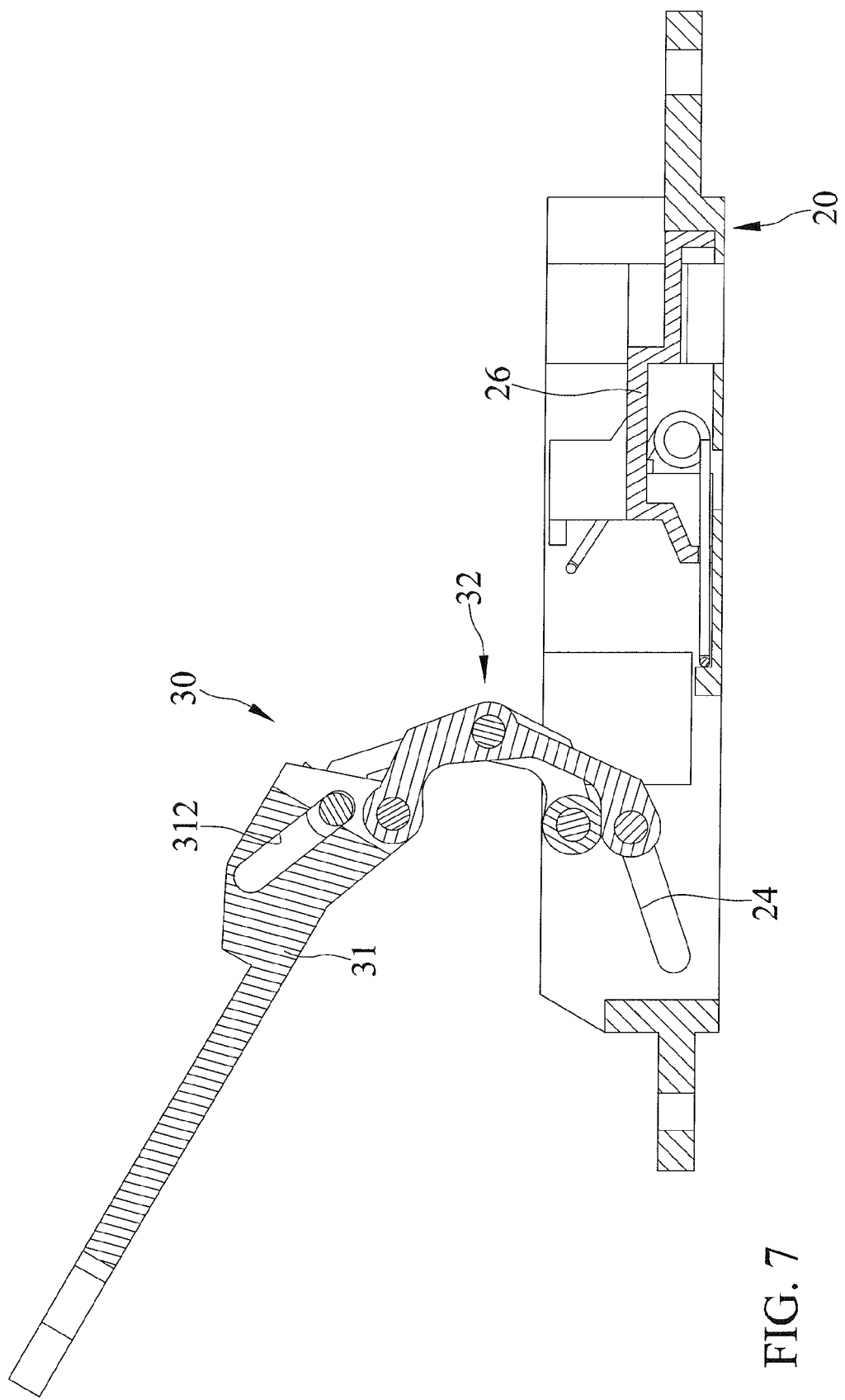
FIG. 7 is a cross sectional view of the pivotal device in an extended position.

FIGS. 6 and 7 show the closed position and the extended position of the pivotal device in use. Specifically, the base 20 is connected to an electronic device or a body of a support of an electronic device. The first movable member 31 of the flip module 31 is connected to a foot stand. After releasing a locking state of the pivotal device 10 in an original position, the first movable member 31 is pushed by the elastic member 27 to move. Furthermore, the elastic member 27 can be stopped by the stopper portions 28. Thus, the flip module 30 can automatically extend to a position in which the angle between the flip module 30 and the base 20 is between 35° and 50° (see FIGS. 4 and 5). The elastic member 27 will not move or sway and, thus, can provide a sufficient elastic force which is stable in magnitude and direction.

A user can push the flip module 30 to reduce the angle between the flip module 30 and the base 20. Furthermore, the angular relationship between the flip module 30 and the base 20 can be fixed in the 0° position (see FIG. 6) by a fixing structure between the foot stand and the body of the support of the electronic device. When the flip module 30 is in a completely closed position, the first movable member 31 and the cover 26 are contiguous to each other. Furthermore, the user can adjust the angular position of the flip module 30 to push the first movable member 31, which, in turn, actuates the second movable member 32 and the third movable member 33 to move relative to the base 20. The maximum angle between the flip module 30 and the base 20 can be between 145° and 165° (see FIG. 7). The cover 26 is exposed without exposure of an interior structure of the electronic device or the pivotal device 10. By the above structure, operation of the pivotal device 10 during the extending or closing procedure is smooth.

In view of the foregoing, when the third movable member 33 pivots relative to the second movable member 32, frictional resistance is generated to fix the angle between the third movable member 33 and the second movable member 32. Operation of the pivotal device 10 during the extending or closing procedure is smooth.

Although specific embodiments have been illustrated and described, numerous modifications and variations are still possible without departing from the scope of the invention. The scope of the invention is limited by the accompanying claims.

The invention claimed is:

1. A pivotal device for a support of an electronic device comprising:
    a base including a pivotal portion and a sliding portion; and
    a flip module including a first movable member, a second movable member, and a third movable member, with the first movable member including a pivotal portion and a sliding portion, with the second movable member including a first pivotal portion, a sliding portion, and a second pivotal portion between the first pivotal portion and the sliding portion of the second movable member, with the first pivotal portion of the second movable member pivotably connected to the pivotal portion of the first movable member, with the sliding portion of the second movable member mounted to the sliding portion of the base and slideable relative to the base, with the third movable member including a first pivotal portion, a sliding portion, and a second pivotal portion between the first pivotal portion and the sliding portion of the third movable member, with the first pivotal portion of the third movable member pivotably connected to the pivotal portion of the base, with the sliding portion of the third movable member mounted to the sliding portion of the first movable member and slideable relative to the first movable member, with the second pivotal portion of the third movable member pivotably connected to the second pivotal portion of the second movable member, wherein when the third movable member pivots relative to the second movable member, frictional resistance is generated to fix an angle between the third movable member and the second movable member.

2. The pivotal device for a support of an electronic device as claimed in claim 1, wherein the frictional resistance is generated by tight coupling between the second movable member and the third movable member.

3. The pivotal device for a support of an electronic device as claimed in claim 2, with the base including two sidewalls and a space between the two sidewalls, with the flip module received in the space of the base and movable relative to the base, with the sliding portion of the second movable member received in the space of the base and including two opposite sides respectively abutting the two sidewalls of the base, and with the first pivotal portion of the third movable member received in the space of the base and including two opposite sides respectively abutting the two sidewalls of the base.

4. The pivotal device for a support of an electronic device as claimed in claim 3, with the base further including a stopper plate, a cover, and an elastic member, with the stopper plate, the cover, and the elastic member located in the space, with the stopper plate including two opposite ends securely fixed to the two sidewalls, respectively, with the cover coupled to the stopper plate, wherein when the flip module is in a completely closed position, the first movable member and the cover are contiguous to each other, with the elastic member including first and second ends and a coil portion between the first and second ends, with the first end of the elastic member abutting the stopper plate, with the coil portion of the elastic member including a plurality of turns and located between the stopper plate and the cover, and with the second end of the elastic member abutting the first movable member.

5. The pivotal device for a support of an electronic device as claimed in claim 4, wherein the elastic member is a torsion spring.

6. The pivotal device for a support of an electronic device as claimed in claim 4, with the two sidewalls of the base respectively including two sides adjacent to each other, with each of the two sides having a stopper portion, wherein the elastic member is stopped by the stopper portions when the flip module is in an extended state.

7. The pivotal device for a support of an electronic device as claimed in claim 6, with the first pivotal portion of the second movable member disposed on an end of the second movable member adjacent to the base, with the sliding portion of the second movable member disposed on another end of the second movable member opposite to the first pivotal portion of the second movable member, with the first pivotal portion of the third movable member disposed on an end of the third movable member adjacent to the first movable member, and with the sliding portion of the third portion disposed on another end of the third movable member opposite to the first pivotal portion of the third movable member.

8. The pivotal device for a support of an electronic device as claimed in claim 7, with the second movable member including a bridge having a first end connected to the first pivotal portion of the second movable member and a second end connected to the sliding portion of the second movable member, with the second pivotal portion of the second movable member disposed on the bridge of the second movable member, with the third movable member including two bridges, with each of the two bridges including a first end connected to the first pivotal portion of the third movable member and a second end connected to the sliding portion of the third movable member, with the second pivotal portion of the third movable member disposed on the two bridges of the third movable member, wherein the bridge of the second movable member is disposed between the two bridges of the third movable member by tight coupling.

9. The pivotal device for a support of an electronic device as claimed in claim 8, with the pivotal portion of the base being a through-hole extending through the two sidewalls of the base, with the sliding portion of the base being an elongated groove extending through the two sidewalls of the base, with the pivotal portion of the first movable member including a through-hole extending through the first movable member, with the sliding portion of the first movable member being an elongated groove extending through the first movable member, with the flip module including an axle unit having a first axle, a second axle, a third axle, a fourth axle, and a fifth axle, with the first axle extending through the sliding portion of the second movable member and slideably extending through the sliding portion of the base, with the second axle extending through the pivotal portion of the base and the first pivotal portion of the third movable member, with the third axle extending through the pivotal portion of the first movable member and the first pivotal portion of the second movable member, with the fourth axle extending through the sliding portion of the third movable member and slideably extending through the sliding portion of the first movable member, and with the fifth axle extending through the second pivotal portion of the second movable member and the second pivotal portion of the third movable member.

* * * * *